Patented Aug. 17, 1926.

1,596,530

UNITED STATES PATENT OFFICE.

IVAN GUBELMANN, OF SOUTH MILWAUKEE, WISCONSIN, ASSIGNOR TO THE NEWPORT COMPANY, OF CARROLLVILLE, WISCONSIN, A CORPORATION OF DELAWARE.

ANTHRACENE DYE AND A PROCESS OF MANUFACTURE.

No Drawing.   Application filed May 9, 1925.   Serial No. 29,216.

This invention relates to coloring matters of the anthracene series and a process of making the same, more particularly to the coloring matters obtained by the condensation of a halogenated pyranthrone body with carbazole.

By "pyranthrone" is meant the coloring matter obtained by heating 2,2'-dimethyl-1,1'-dianthraquinonyl. This coloring matter dies cotton from a hydrosulfite vat in violet shades, yielding orange shades on oxidation. It is known in the chemical arts as pyranthrone and shall hereinafter be referred to by this name.

The condensation reaction between the halogenated pyranthrone body and carbazole results in a coloring matter of the type $R^1-R^2$, in which $R^1$ represents the pyranthrone complex and $R^2$ the carbazole radicle and in which the pyranthrone complex is linked to the nitrogen atom of the carbazol radicle, and in the formation of a halogen acid. The reaction proceeds best in the presence of a high boiling solvent, at temperatures ranging between 150° and 210° C. Neutralizing agents, such as anhydrous sodium acetate or sodium carbonate, and catalyzers, such as basic copper acetate, may be used to facilitate the reaction.

The following examples will serve to illustrate my invention in a preferred form, but I do not wish to limit the process to these examples:

*Example 1.*—Suspend 50 parts by weight of finely ground dibrom-pyranthrone in 600 parts by weight of dry nitrobenzol. Add 20 parts by weight of carbazole, 25 parts by weight of anhydrous sodium acetate, in the form of a fine powder, and 10 parts by weight of basic copper acetate as a catalyzer. Heat the mixture under agitation to 200° C. for a period of 20 hours. The color of the mixture changes gradually to a dark brown. Cool the reaction mass to 60° C. and add 400 parts by weight of denatured alcohol. Stir the mixture for 1 hour and filter off the brown reaction product. Wash the filter cake with denatured alcohol and hot water until the solvent and the inorganic salts have been eliminated. After drying and grinding, the reaction product constitutes a red-brown powder which, from a hydrosulfite vat, dyes cotton a violet shade which oxidizes to a rich brown shade on exposure to air or other suitable oxidizing agents.

The product of the reaction between dibrompyranthrone and carbazole is probably best represented by the following chemical formula:

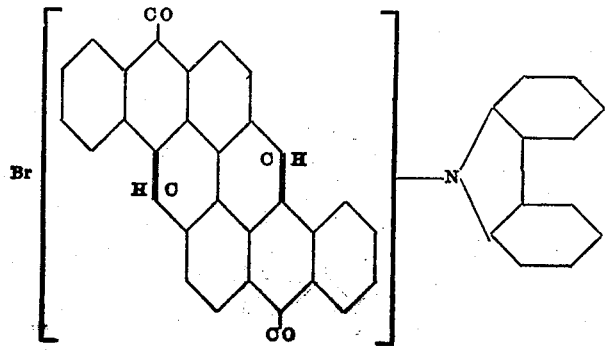

The exact position of the bromine atom remaining in the pyranthrone radicle and of the coupling bond is not known. The second bromine atom unites with one hydrogen atom from the amino group to form hydrobromic acid.

*Example 2.*—Suspend 50 parts by weight of finely ground dichlor-pyranthrone in 600 parts by weight of naphthalene. Add 25 parts by weight of carbazole, 25 parts by weight of anhydrous sodium carbonate in the form of a fine powder, and 5 parts by weight of basic copper acetate as catalyzer. Heat the mixture under agitation to 200° C. for a period of 20 hours. The color of the mixture changes gradually from red to dark brown. Pour the reaction mass into 500 parts by weight of water and remove the naphthalene completely by steam distillation. Filter off the remaining brown product and wash the filter cake thoroughly with hot water to remove inorganic salts. After drying and grinding, the reaction product forms a brown powder which dyes cotton from a hydrosulfite vat a violet shade which oxidizes to a rich brown shade on oxidation with well-known oxidizing agents used in the dyeing of vat colors.

While the temperature specified in the above examples is 200° C. I have found that, by varying the temperature above and below 200° C. various shades of product ranging from reddish-brown to yellowish-brown are obtained. The coloring matters thus obtained give shades on dyeing that are extremely fast to washing, light and other influences. The coloring matters themselves are insoluble in hot and cold water, sparingly soluble in dilute acids and organic solvents, but usually more so in organic high boiling solvents. They dissolve in concentrated sulfuric acid, giving a blue to purple color, and they are precipitated out again on dilution with water. They are, however, easily soluble in alkaline hydrosulfite solution.

I am aware that numerous details of the process may be varied through a wide range without departing from the spirit of this invention, and I do not desire limiting the patent granted other than as necessitated by the prior art.

I claim as my invention:

1. The process of producing coloring matters of the anthracene series, which consists in heating a halogenated pyranthrone body with carbazole in the presence of a high boiling solvent and a neutralizing agent.

2. The process of producing coloring matters of the anthracene series, which consists in heating a halogenated pyranthrone body with carbazole in the presence of a high boiling solvent, a neutralizing agent and copper salts.

3. The process of producing coloring matters of the anthracene series, which consists in heating dibrom-pyranthrone with carbazole in the presence of a high boiling solvent and a neutralizing agent.

4. The process of producing coloring matters of the anthracene series, which consists in heating dibrom-pyranthrone with carbazole in the presence of a high boiling solvent, anhydrous sodium acetate as a neutralizing agent and a catalyst.

5. As new articles of manufacture, the coloring matters of the anthracene series which are obtained by heating a halogenated pyranthrone body with carbazole.

6. As new articles of manufacture, the coloring matters of the anthracene series which are obtained by heating a brominated pyranthrone body with carbazole.

7. The process of producing coloring matters of the anthracene series, which consists in heating a halogenated pyranthrone body with carbazole.

8. As new articles of manufacture, coloring matters of the anthracene series having most probably the following general formula:

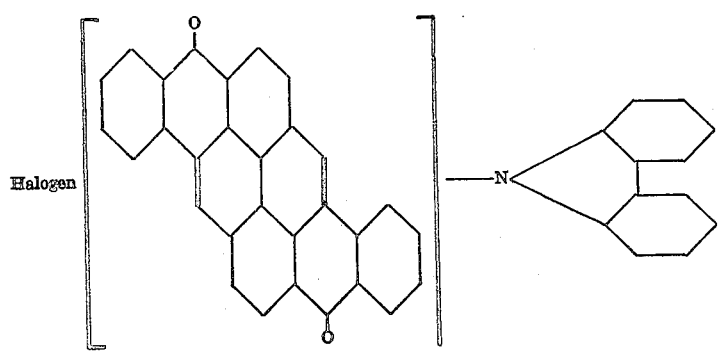

said coloring matters being in general red brown powders, which from a hydrosulfite vat, dye cotton a violet shade, which shade oxidizes to a rich brown shade on exposure to air or other oxidizing agents.

9. As new articles of manufacture, coloring matters of the anthracene series having most probably the following formula:

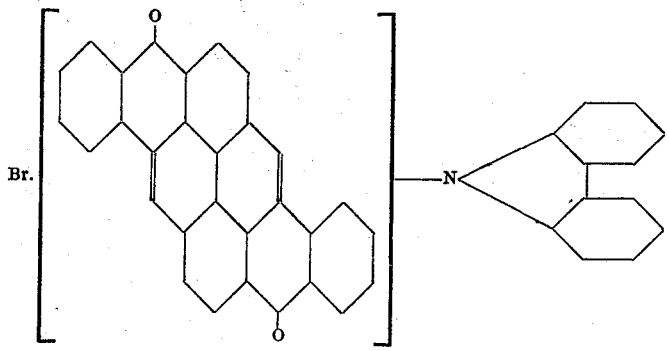

said coloring matters being in general red brown powders, which from a hydrosulfite vat, dye cotton a violet shade, which shade oxidizes to a rich brown shade on exposure to air or other oxidizing agents.

10. Materials dyed with the coloring matters described in claim 8.

11. Materials dyed with coloring matters described in claim 9.

In testimony whereof I have hereunto subscribed my name.

IVAN GUBELMANN.